AUTOMATIC TELEPHONE DIAL LIGHT ATTACHMENT

Filed Sept. 16, 1947 3 Sheets-Sheet 1

Inventor
Frank J. Shenk
By Clarence A. O'Brien and Harvey B. Jacobson
Attorneys

July 24, 1951 F. J. SHENK 2,561,950

AUTOMATIC TELEPHONE DIAL LIGHT ATTACHMENT

Filed Sept. 16, 1947 3 Sheets-Sheet 2

Inventor

Frank J. Shenk

By Clarence A. O'Brien
and Harvey B. Jacobson
Attorneys

July 24, 1951 F. J. SHENK 2,561,950

AUTOMATIC TELEPHONE DIAL LIGHT ATTACHMENT

Filed Sept. 16, 1947 3 Sheets-Sheet 3

Inventor

Frank J. Shenk

By Clarence A. O'Brien and Harvey B. Jacobson

Attorneys

Patented July 24, 1951 2,561,950

UNITED STATES PATENT OFFICE 2,561,950

AUTOMATIC TELEPHONE DIAL LIGHT ATTACHMENT

Frank J. Shenk, Washington, D. C.

Application September 16, 1947, Serial No. 774,247

5 Claims. (Cl. 179—90)

The present invention relates to ways and means whereby an illuminable lamp bulb is utilized to provide a source of light sufficient to illuminate the dial on a dial-type telephone and has more specific reference to a novel structural adaptation which is in the form of an attachment whose component parts are such as to be satisfactorily usable on the stock parts of a standard-type telephone.

Another object of the invention is to provide a light for a standard-type telephone dial, said light being characterized by a curvate reflector and bulb located and positioned in such a manner that the light rays are projected and flooded over the face of the dial from a marginal point, this without interfering with the dialing operations.

Another object of the invention is to provide a novel dial illuminating bulb or lamp, and means for supporting and properly locating same in operative relation to a regulation style dial, the embodiment of the invention being such that it includes a trip member included in a circuit make and break device, which trip member is normally interposed between the telephone receiver and a part of the usual cradle, whereby the weight of the receiver serves to actuate said trip member and to normally keep the circuit open so that, as soon as the telephone receiver is picked up for dialing, the light comes on automatically and functions in the desired manner.

A still further object of the invention has to do with dial lighting means of the form and style stated which is such that a dry cell battery may be employed to provide the source of current for electrifying the lamp.

In carrying out the invention, two forms are herein shown and described. Generically, these include a circuit make and break device which has means whereby it may be conveniently mounted, as an attachment, on the base of the telephone, said device serving as a central support for a forwardly and downwardly hung yoke, said yoke being used as an adaptor for the reflector equipped lamp or bulb. The same device, the circuit make and break device, is used as a support for added complements which provide a battery hanger and means for supplying the current from the battery to the circuit make and break device and from the latter to the lamp bulb.

Other objects and advantages will become more readily apparent from the following description and the accompanying illustrative drawings.

In the drawings, wherein like numerals are employed to designate like parts throughout the views.

Attention is first invited to the form of the invention illustrated in Figures 1 to 12 inclusive.

Figure 1:
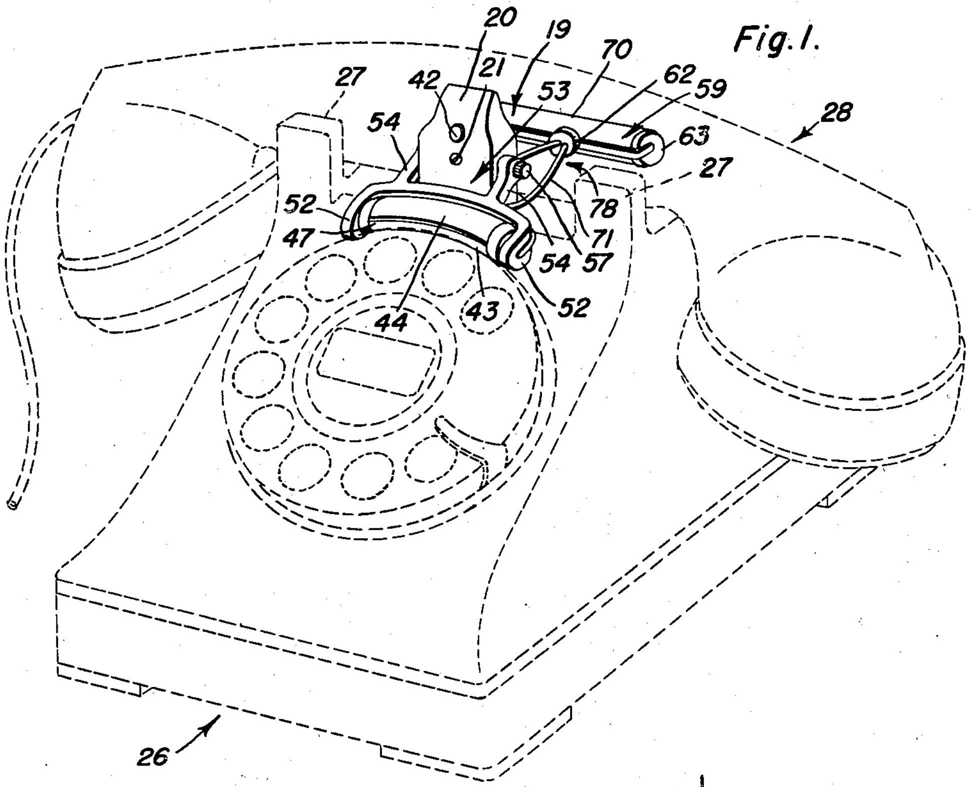
Figure 1 is a perspective view showing, primarily in phantom lines, a French-type telephone including dialing means and also including the means which constitutes the present invention, that is the means for lighting the dial automatically.
Figure 3:
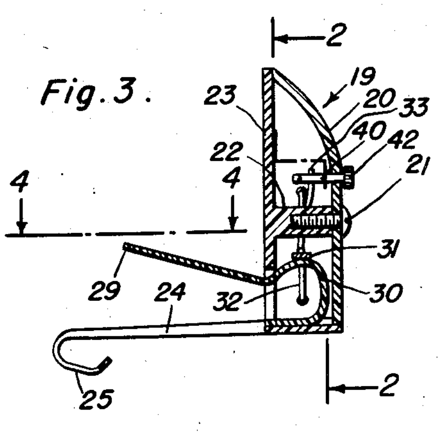
Figure 3 is a vertical section at right angles to Figure 2, this being on the vertical line 3—3 of Figure 2, also looking in the direction of the arrows.
Figure 2:
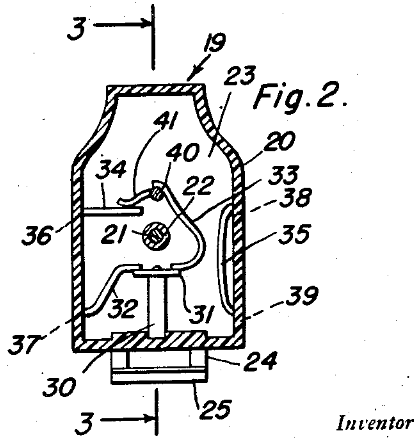
Figure 2 is a central vertical sectional view taken on the somewhat irregular line 2—2 of Figure 3, looking in the direction of the arrows.
Figure 4:
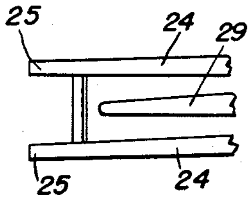
Figure 4 is a fragmentary section taken approximately on the line 4—4 of Figure 3.
Figures 5, 6, 7, 8, 9, 10, 11, 12:
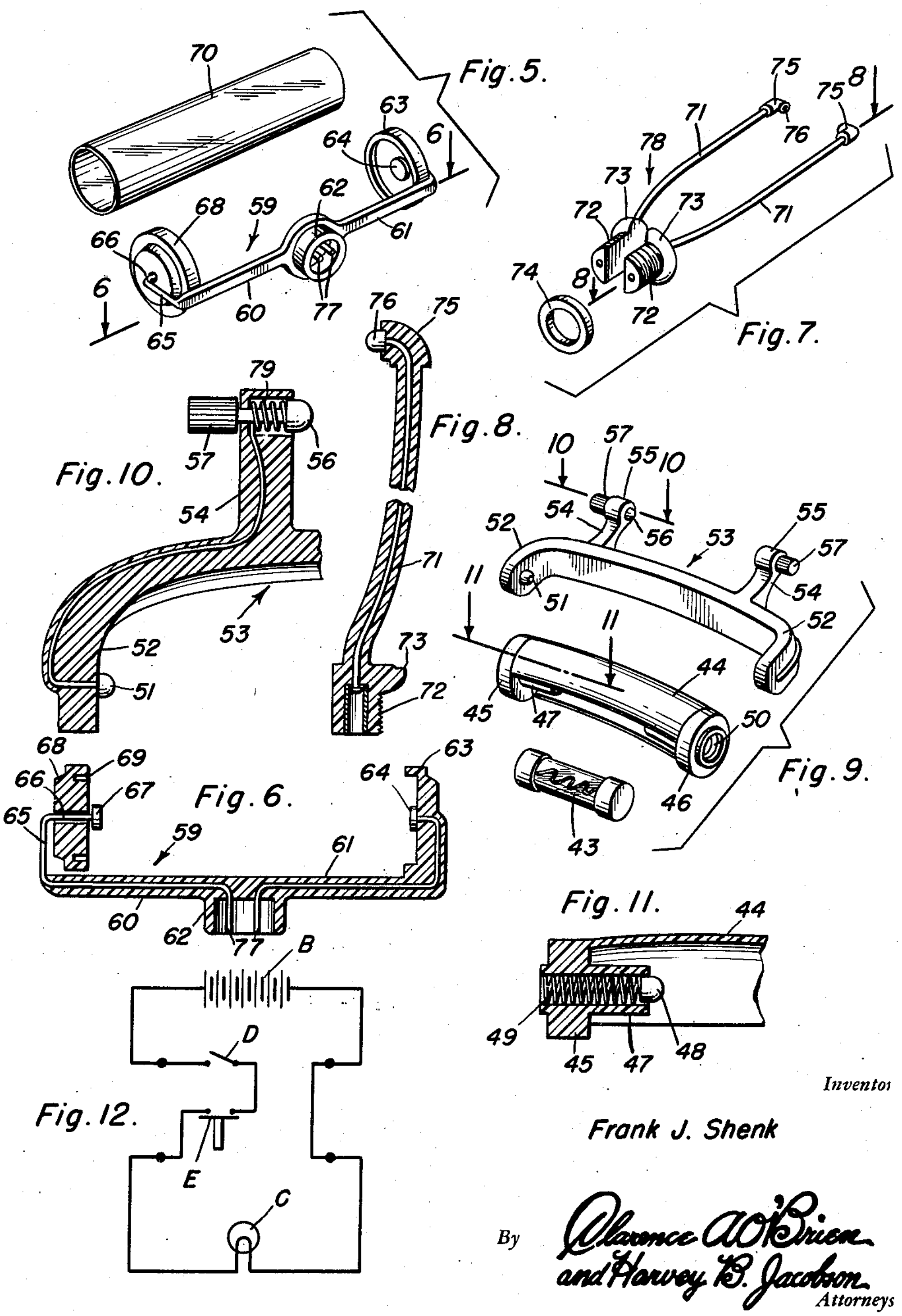
Figure 5 is a group perspective view of the battery hanger fixture.
Figure 6 is a horizontal sectional view taken approximately on the line 6—6 of Figure 5, looking in the direction of the arrows, the view being on an enlarged scale.
Figure 7 is a group perspective view of the adaptor which electrically connects a source of current from the battery hanger and battery to the vertical circuit make and break device.
Figure 8 is an enlarged sectional view on the line 8—8 of Figure 7, this being of a fragmentary type.
Figure 9 is a group perspective view showing the suspension fixture, reflector, and lamp bulb, forming the principal means for flooding light on the dial.
Figure 10 is an enlarged horizontal section on the line 10—10 of Figure 9.
Figure 11 is a fragmentary section on the line 11—11 of Figure 9.
Figure 12 is a view of one form of wiring diagram.

It is believed advisable to refer first to the circuit make and break device as this is an essential part of the overall assemblage. This device in the drawings (see Figs. 1, 2 and 3) is denoted by the numeral 19 and comprises an appropriately shaped casing or shell 20 fastened by a screw 21 to a stud 22 on a cover plate 23. The device 19 is provided with a pair of reach arms 24 which terminate in hooks 25, said hooks being adapted to engage over the bed portion of the cradle structure on the telephone base 26. The base 26 includes the usual upstanding lugs 27 defining the cradle for the combination mouthpiece and receiver device 28. This device 28 when it is situated in the cradle, provides the necessary weight to normally keep the circuit open. This is accomplished by properly utilizing, in conjunction with the arms 24, a trigger spring 29. The latter includes a curvate spring 30 on the interior of the casing which spring carries a contact element 31 (see Fig. 2). The contact element serves to bridge co-acting ends of wires 32 and 33 as shown. Additional wires 34 and 35 are provided, the wire 34 anchored in a depression or socket 36, the wire 32 co-acting with a socket 37 in the side wall of the casing and the wire 35 having its opposite ends connected with similar sockets on the opposite side, that is, the sockets in the casing denoted by the numerals 38 and 39. It will be noted that there is a rocker shaft 40 mounted in the casing, as shown in Figures 2 and 3, and this is provided with a cut-out contact element 41. This contact element co-acts with the wires 33 and 34 and makes it possible to cut out the circuit passing through the circuit make and break device whenever necessary or desirous. The rocker shaft 40 is provided with a knob 42 which is conveniently located on the casing so that, during the day, or during a long telephone conversation, the circuit make and break device may be, by hand, thrown out of use. Normally, it is set as shown in Figure 2 and hence the device is ready for operation. The main circuit is open by the weight of the receiver 28 and, when the receiver is lifted, the spring arm 29 goes up, carries the contact 31 up and bridges the wires 32 and 33 and thus closes the circuit to operate the lighting means. The lighting means, as shown in Figure 9, comprises a small or miniature lamp bulb 43 which is fitted removably in a reflector 44, said reflector having heads 45 and 46 at opposite ends, these to provide suitable sockets. The socket 47 at the left in Figure 11 is provided with a spring pressed contact element 48 and a co-acting spring 49. The socket at the opposite end, the socket 50, is of a suitable construction. These sockets serve to receive contact buttons or elements 51 on the laterally directed arms 52 of the suspension yoke 53. The yoke is provided with accommodation arms 54 having bearings 55 with buttons 56 and controlling knobs 57. The arms 54 straddle the opposite vertical side portions of the device 19 as shown in Figure 1 and the buttons 56 snap into the sockets 36 and 38 provided therefor.

Referring now to Figure 5, the hanger means for the dry cell battery is shown. This comprises a substantially U-shaped hanger bracket 59 having arm portions 60 and 61 and provided with a central socket 62. The arm 61 is provided with a cup 63 at one end having a contact button 64. The arm 60 at the opposite end is directed laterally at the points 65 and 66 where it is provided with a button 67 operating with the central portion of a shiftable head or cup 68, the latter having a groove 69 (Fig. 6) for the end portion of the transparent cylinder or shell 70. This shell fits into the cupped head 63 at one end and into the groove 69 of the head 68 at the opposite end. The shell is adapted to accommodate a dry cell battery (not shown).

The adaptor which transfers current from the dry cell battery comprises a structure comprising limbs 71, these of duplicate construction. The limbs have screw threaded portions 72 at their outer ends and shoulders 73. A ring 74, which is appropriately screw threaded, fits on the portions 72 and serves to couple the same together. The limbs 71 are flexible and have elbow-like members 75 which also include contact elements or buttons 76. These buttons snap into the remaining recesses 37 and 39 on the circuit make and break device 19 as brought out in Figure 1. The screw threaded portions 72 co-act in providing a shank and this either threads or fits frictionally into the socket 62 for electrical connection with the prongs 77. It follows that in this form of the device, the bulb 43 is positioned near the peripheral portion of the dial for illuminating same in an obvious fashion. The bulb is out-of-the-way of the movable part of the dial construction and therefore does not interfere with dialing. The suspension yoke 53 may be raised and lowered as desired. The battery hanger fixture 59 on the back serves to accommodate the battery for supplying a current and the adaptor device, the device 78 as shown in Figure 7 is sufficient to transmit the current from the battery to the circuit make and break device where it is properly used, by the device and its complemental parts to supply light for the dial.

Referring to Figure 6, it will be seen that the socket 62 and arms 60 and 61 and head formation 63 are fashioned upon a unified body of plastic or equivalent material and that the conductor elements are embedded within the plastic itself. This exaggerated view will serve to bring out an operative construction. Likewise, in Figure 8, we see an exaggerated illustration of one of the limbs or arms 71 which has the necessary conductor element embedded therein. In Figure 10, the exaggerated figure is for the same purpose of clearness of illustration but here it will be noted that the contact button (and this may be either one or both of the buttons 56) is slidably mounted and provided with a cushioning spring 79 to permit the contact buttons to snap into the respective end sockets, provided therefor, on the reflector heads 45 and 46. In the wiring diagram B denotes a suitable battery to supply current to the light bulb C through the medium of appropriately interconnected wires including a cut-out D and circuit make and break device E. The parts C, D and E correspond to the aforementioned parts 41, 33 and 31 respectively (see Fig. 2).

Figure 13:
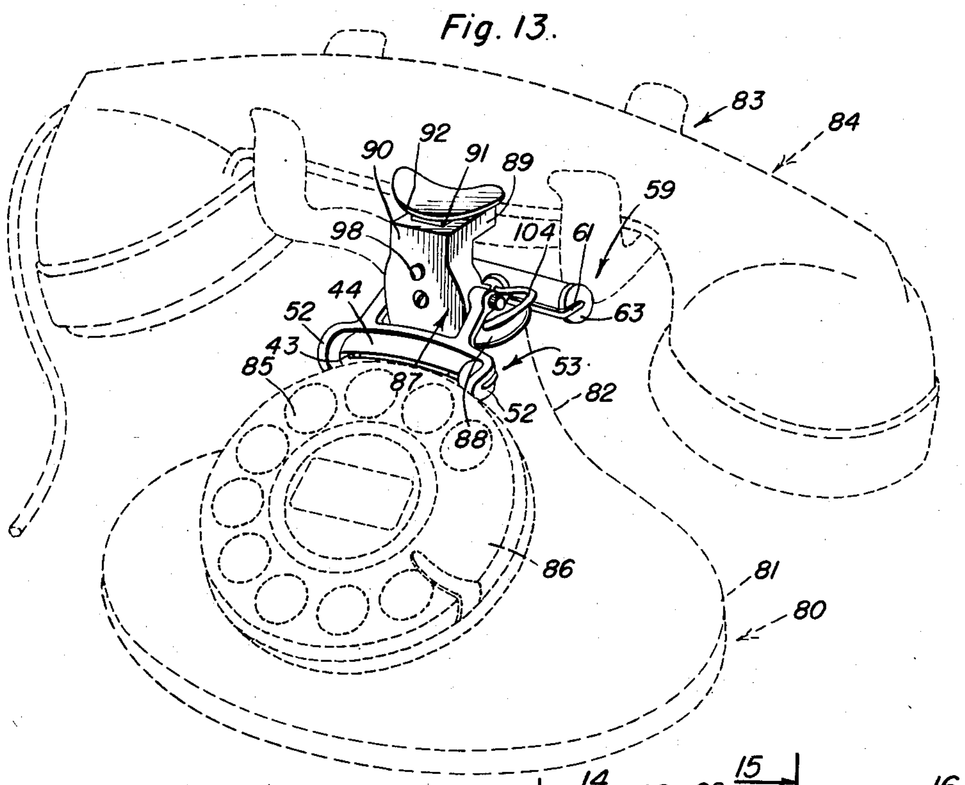
Figure 13 is a perspective view showing a modified type of telephone and a correspondingly modified automatic telephone dial light construction.
Figure 14:
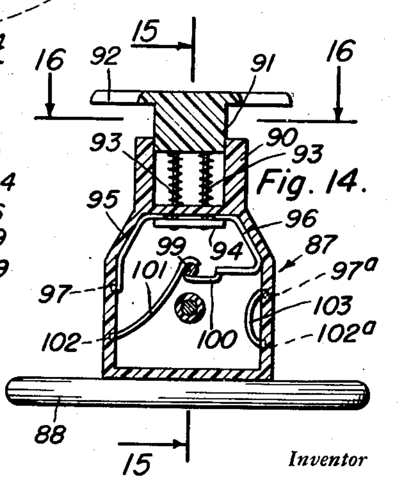
Figure 14 is a vertical section on the line 14—14 of Figure 15.
Figures 15, 16, 17:
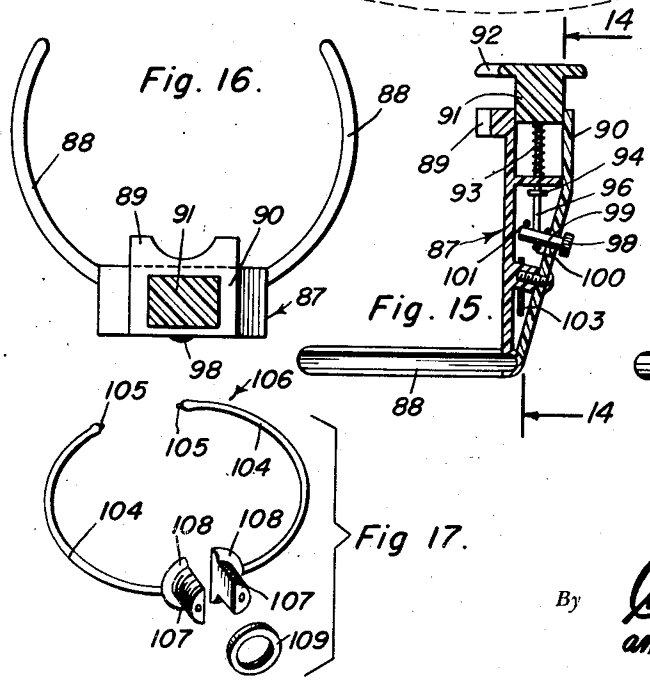
Figure 15 is a central vertical section at right angles to Figure 14 on the line 15—15 of Figure 14.
Figure 16 is a horizontal section on the line 16—16 of Figure 14.
Figure 17 is a perspective view of the adaptor means which is employed in the embodiment of the invention illustrated in Figure 13.

Attention is directed now to the modified form of the invention as seen in Figure 13 and complemental Figures 14, 15, 16 and 17. In Figure 13, a different type of "French" telephone is shown, this at 80, the same including a base 81, stand 82 and cradle means 83 for the dual purpose receiver unit 84. The dial is at 85 and the dialing disc at 86. Here, the switch or circuit make and break device is denoted, generally speaking by the numeral 87 and comprises a vertically disposed shell-like casing carrying a substantially C-shaped clamp 88 at its bottom which embraces the standard of the telephone, as shown in Figure 13. The shell also has a retaining lug at 89 and a socket at 90 which socket is adapted to accommodate the projectable and retractible plug 91. The plug is provided with a suitably shaped head 92 which, when situated beneath the receiver, when the latter is in the cradle, is forced downwardly against the tension of the return springs 93. The springs surround pins which are connected with a "cross-head" contact element or bar 94. This bar, as shown in Figure 14, is adapted to bridge stationary contacts 95 and 96, the contact 95 leading to a depression or socket 97 provided in the rim or side wall of the casing. A turn button 98 is provided on the turning shaft 99 carrying a contact clip 100 which bridges an adjacent portion of the stated contact 96 and the co-acting end portion of another contact 101 which leads to the socket 102 on the left side of the casing in Figure 14. Co-acting depressions $97^a$ and $102^a$ are provided on the opposite side of the shell or casing and are connected by a conductor or wire 103. It is obvious that the cut-out 98 is used the same as the cut-out in the aforementioned form of the invention. That is to say, if a long conversation is to be had over the telephone, the light is turned off by properly actuating the button or cut-out 98. This button is also turned to open the circuit during the daytime when, as a general proposition, the dial illuminating bulb is not needed. Normally, however, the element 100 on said button bridges the contacts 96 and 101 as shown in Figure 14. It follows, therefore, that normally the plug 91 is pressed down into the socket 90 and this disengages the bridging contact 94 from the co-acting contacts 95 and 96. The moment the receiver 84 is lifted, the plug and head parts 91 and 92 go up as shown in Figures 14 and 15 thus causing the part 94 to bridge the contacts 95, 96. The light then comes on automatically. The light is cut out when the receiver is returned to the cradle. The dry cell or battery holder device in this form of the invention is the same as that already described and denoted primarily by the reference numeral 59 in Figure 5. Therefore, it seems unnecessary to attempt to describe this part in Figure 13 since it is primarily obscured from view. This is also true of the lamp or bulb hanger which is denoted essentially by the reference numeral 53 in Figure 9. That is to say, the hanger in Figure 13 is the same as that already described. It might be pointed out, in this connection that the connection between the contact buttons on the yoke 53, or rather the arms 54 thereof is made by snapping the buttons into the depressions 97 and $97^a$ provided therefor in Figure 14. The remaining depressions 102 and $102^a$ serve to accommodate the tips on the ends of the limbs 104, that is the tips 105 of the adaptor fixture 106 seen in Figure 17. Here, the limbs have semi-circular threaded studs 107 properly shouldered at 108 and assembled by a coupling ring 109. This fixture 106 operates like the one 78 already described.

It is obvious that, generically speaking, both embodiments of the invention have to do with a structure of the type specified and illustrated including an illuminable lamp, means for locating and retaining said lamp in a position to flood light rays on said dial, a circuit make and break device which is adapted to be supported on the base of the standard-type French telephone, said device including a circuit opening and closing member which cooperates with the telephone receiver, which is normally depressed when the latter assumes a circuit opening position and adapted, when the receiver is lifted, to close the circuit and at the same time illuminate the dial.

Then too, novelty is predicated in both forms of the invention on the device embodying a hand cut-out switch or button which is conveniently located on the circuit make and break device and which is turned off and on at will depending on whether the dial light is needed, this as explained.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed Having described the invention, what is claimed as new is:

1. An attachment for suspending and positioning a dial illuminating lamp on a dial telephone which includes the usual stationary base, fixed dial and rotary dialing ring cooperable with said dial comprising a longitudinally bowed hanger yoke having means whereby said dial lamp will lie horizontally in a plane between said dial and rotary dialing ring, a vertically disposed circuit make-and-break unit having supporting and retaining means for attachment to said base and provided with switch controlled current conducting means including complemental contacts, the central portion of said yoke having lateral arms straddling and embracing opposite marginal portions of said circuit make-and-break unit, said lateral arms having spring-pressed contact buttons, means whereby the buttons are releasably connected with the contacts provided therefor in said circuit-make-and-break unit, said arms hingedly suspending said yoke from said circuit make-and-break unit in a manner to permit the yoke to swing to and to take the desired position in a plane with said dial, the latter end portions of said yoke having contact buttons, a reflector having spring-pressed contact buttons releasably connected with said last-named contact buttons, the contact buttons on said reflector being provided to support an insertable and removable dial lamp.

2. As a new article of manufacture and as a component part of an assemblage of the class shown and described, a dry-cell holder for a telephone dial light comprising a substantially U-shaped frame having lateral contact equipped heads at opposite ends, said heads being in opposed alignment, an open ended dry cell holding cylinder having its end portions removably supported between said heads, the intermediate portion of the bight of said frame having socket means in electrical connection with the contacts on said heads, a readily attachable and detachable adapter unit having opposed resilient electrically wired limbs terminating at their outer free ends in contact buttons, the opposite ends of said limbs being joined mechanically and having a stud, the wires in said limbs extending into said stud and said stud being separably connectable with said socket, and means including the aforementioned whereby to permit said U-shaped frame, by way of said adapter unit, to be detachably mounted on and used in connection with a circuit make and break unit.

3. In a dry cell type dial illuminator for dial telephones, a circuit make and break unit provided with means for detachably supporting said unit on a stock part of a conventional telephone, said unit embodying current conducting means including a switch, means whereby said switch is automatically actuable by a telephone receiver, said switch being normally open and automatically closable when said receiver is picked up for dialing a number, a hanger yoke provided with laterally projecting arms electrically and detachably connected with said circuit make and break unit, means whereby when said yoke is in use it will occupy a position in a plane between the usual fixed dial and customary rotary finger ring cooperable with said dial, an arcuately curved reflector detachably supported in said yoke and conforming in general curvature to the curvature of the adjacent marginal portion of the dial, said reflector being provided internally at opposite end portions with spring pressed contacts for electrically and removably supporting a dry cell lamp bulb, a second yoke located on a side of the circuit make and break unit opposite to that from which the first named yoke is suspended, a dry cell electrically mounted in said second named yoke, means carried by the said second named yoke and straddling an adjacent part of the telephone and serving to detachably and electrically connect said second named yoke with said circuit make and break unit, and means including the foregoing whereby the circuit make and break unit is supported from a stationary part of the stated telephone and functions to support both of said yokes and the parts mounted in said yokes.

4. In a dial light illuminator for dial telephones, a circuit make and break device comprising a casing having means for holding same in operative position on a predetermined part of a telephone and provided marginally with depressions for delivering current to attachment accessories, having a plurality of internal contacts cooperating with said depressions, having an actuator contact equipped member, means whereby said actuator coacts with the contacts in said casing and also with a telephone receiver, and further having a rotary shaft with a button, said shaft having a contact element and said contact element being cooperable with contacts in said casing in a manner to permit the current passing through said casing to be switched on and off at the will of the user, a longitudinally curved yoke, a correspondingly curved reflector fitted removably between lateral end portions of said yoke, a curved lamp bulb removably fitted in said reflector, and contact equipped lateral arms carried by the bight portion of said yoke and straddling and electrically connected with predetermined depressions provided in said casing, means including said arms serving to hang and suspend the yoke so that it, and the reflector and bulb, may occupy a position substantially in a plane with the dial to project the light rays between the dial and the customary rotary dialing ring on said dial.

5. In a dial light illuminator for dial telephones, a circuit make and break device comprising a casing having means for holding same in operative position on a predetermined part of a telephone and provided marginally with depressions for delivering current to attachment accessories, having a plurality of internal contacts cooperating with said depressions, having an actuator contact equipped member means whereby said actuator coacts with the contacts in said casing and with a telephone receiver, and further having a rotary shaft with a button, said shaft having a contact element and said contact element being cooperable with contacts in said casing in a manner to permit the current passing through said casing to be switched on and off at the will of the user, a longitudinally curved yoke, a correspondingly curved reflector fitted removably between lateral end portions of said yoke, a curved lamp bulb removably fitted in said reflector, and contact equipped lateral arms carried by the bight portion of said yoke and straddling and electrically connected with predetermined depressions provided in said casing, means including said arms serving to hang and suspend the yoke so that it, and the reflector and bulb, may occupy a position substantially in a plane with the dial to project the light rays between the dial and the customary rotary dialling ring on said dial, a substantially U-shaped frame, a dry cell battery holder removably mounted in said frame, an adapter detachably connected with the bight portion of said frame, said adapter embodying spaced parallel resilient limbs, said limbs being electrically wired and terminating at their free ends in contacts and said contacts being detachably connected with predetermined depressions in the stated casing.

FRANK J. SHENK.

REFERENCES CITED

The following references are of record in the file of this patent:

UNITED STATES PATENTS

| Number | Name | Date |
|---|---|---|
| 1,918,876 | Smith | July 18, 1933 |
| 1,945,956 | Rowell | Feb. 6, 1934 |
| 1,961,474 | Baum | June 5, 1934 |
| 1,982,457 | Schmitt | Nov. 27, 1934 |
| 2,247,591 | Sundee | July 1, 1941 |
| 2,259,148 | Burkhart | Oct. 14, 1941 |
| 2,284,451 | Schauer | May 26, 1942 |
| 2,397,469 | Casonov | Apr. 2, 1946 |
| 2,410,527 | Schinske | Nov. 5, 1946 |

FOREIGN PATENTS

| Number | Country | Date |
|---|---|---|
| 27,276 | Great Britain | Oct. 16, 1913 |